(No Model.)
T. A. EDISON.
REGULATOR FOR DYNAMO ELECTRIC MACHINES.
No. 524,136. Patented Aug. 7, 1894.
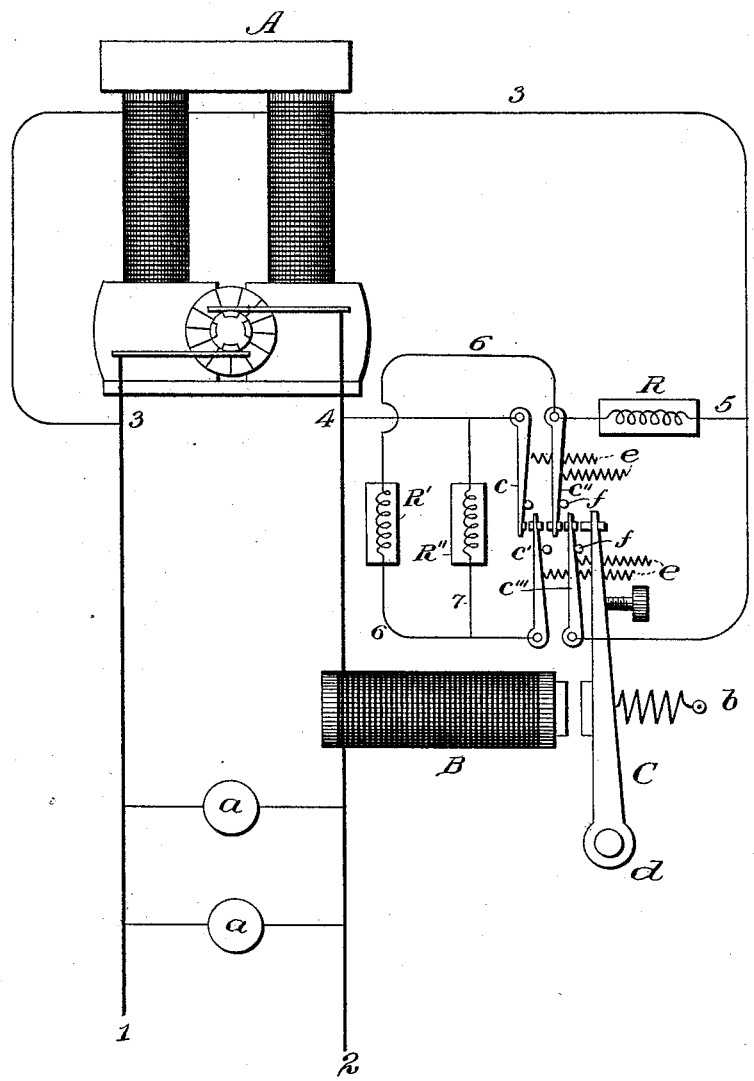
Witnesses:
Inventor:
Thomas A. Edison,
By Rich'd N. Dyer
Atty.

UNITED STATES PATENT OFFICE.

THOMAS A. EDISON, OF MENLO PARK, NEW JERSEY, ASSIGNOR TO THE EDISON ELECTRIC LIGHT COMPANY, OF NEW YORK, N. Y.

REGULATOR FOR DYNAMO-ELECTRIC MACHINES.

SPECIFICATION forming part of Letters Patent No. 524,136, dated August 7, 1894.

Application filed November 11, 1881. Serial No. 45,667. (No model.)

*To all whom it may concern:*

Be it known that I, THOMAS A. EDISON, of Menlo Park, in the county of Middlesex and State of New Jersey, have invented a new and useful Improvement in Regulators for Dynamo-Electric Machines, (Case No. 353,) of which the following is a specification.

The object of my invention is to produce a simple and reliable means for automatically varying the resistance placed in the field circuit of a dynamo electric machine so as to regulate the supply of current in a system of electric lighting supplied from such machine. This is accomplished by means of an electro magnet placed in the main or consumption circuit from the generator, which magnet, as it is more or less energized by the increase or diminution of current consequent on the addition or removal of lamps, actuates an armature lever by means of which more or less resistance is thrown into the field circuit, the latter being a derived circuit from the main line. Appropriate arrangements for accomplishing this are shown in the drawing, which represents a dynamo electric generator and the circuits connected therewith.

A is the generator, and 1, 2 the main or consumption circuit therefrom, in which translating devices as $a$ are placed in multiple arc.

3, 4 is the field of force circuit, by which the magnets of the generator are energized. This is a derived or shunt circuit from the circuit 1, 2.

B is the electro magnet, placed directly in the main circuit 1, 2.

C is its armature lever, pivoted at $d$ and provided with a spring $b$ which tends to withdraw it from the magnet. Opposite the free end of the lever, are a number of contact points or blocks on the ends of pivoted levers $c\ c'\ c''\ c'''$. These are adapted to be forced together by the pressure of the armature lever C and have springs which draw them back when this pressure is removed.

As shown in the drawing, few lamps or other translating devices are in the main circuit 1, 2, hence its resistance is high, but little current is passing through it and the magnet B is only feebly energized, so that the armature lever C is withdrawn, all the contacts $c\ c'\ c''\ c'''$ are broken, the field circuit being as follows: *via* wire 3 through the field magnets, wire 5, resistance R, wire 6, resistance R', wire 7, resistance R'', and wire 4, thus including all the resistances R, R', R'', this being necessary to weaken the magnet to the proper point for supplying current to the small number of lamps in circuit. If, however, more translating devices are placed in the circuit 1, 2, the resistance of that circuit is lessened and the flow of current therethrough is increased; but it is necessary also to strengthen the field magnet in order to supply properly with current the additional number of lamps. The magnet B, however, is now more strongly energized by the additional flow of current through the main circuit and it draws the armature lever C toward it until the contact arm $c'''$ touches $c''$ and closes a circuit as follows: wire 3, contact arms $c'''\ c''$, wire 6, resistance R', wire 7, resistance R'', and wire 4, thus omitting one resistance, R. If the lever C is still further attracted, $c''$ touches $c'$ and closes a circuit 3, $c$, $c'$, 6, 7, R'', 4, leaving only one resistance, R'', in circuit. When $c'$ touches $c$ this last resistance is cut out, the circuit being wire 3, contact arms $c'''\ c$ and wire 4. If the translating devices are cut out of circuit 1, 2, the current in that circuit is reduced, the energy of the magnet B lessened and the armature lever and contact arms are drawn back by their springs, the successive contacts being broken and the resistances being thrown in one after another.

The springs $b\ e$ attached to the lever and contact arms are of definite resilience determined by experiment, and the contact arms have stops $f$ so that the addition or removal of a definite predetermined number of translating devices will cause a definite movement of the contacts and throw the proper amount of resistance into the field circuit.

It is evident that the arrangement and number of resistances and contacts may be altered in many ways without departing from the spirit of my invention. The generator A may be a dynamo electric machine supplying current to the field magnet coils of a magneto electric machine or a battery of such magneto electric machines, or the circuit 3, 4 might be one including the field magnets of a number of generators.

What I claim is—

1. The combination with a dynamo electric machine, having its field circuit derived from the main or armature circuit, of an electro magnet placed directly in the main circuit of such machine, and a variable resistance placed directly in its field of force circuit, the said magnet varying the resistance of the field circuit as the magnet is more or less energized, substantially as set forth.

2. The combination with a dynamo electric machine, having its field circuit derived from the main or armature circuit, of an electro magnet placed directly in the main circuit of such machine, variable resistance placed directly in its field of force circuit, and a series of movable contacts arranged in line opposite the free end of the armature lever of said magnet for varying the field resistance by the movement of such armature lever, substantially as set forth.

3. The combination with a dynamo electric machine, having its field circuit derived from the main or armature circuit, of a variable resistance located directly in said field circuit for regulating the current flowing therethrough, a series of movable arms, carrying contact points arranged in line, and controlled by springs and stops having a precalculated resilience and position, and means affected by the current generated for moving such arms, whereby the addition or removal of translating devices will cause the proper predetermined amount of resistance to be thrown into or out of said field circuit, substantially as set forth.

This specification signed and witnessed this 27th day of September, 1881.

THOS. A. EDISON.

Witnesses:
H. W. SEELY,
RICHD. N. DYER.